(12) United States Patent
Chao et al.

(10) Patent No.: US 8,399,800 B2
(45) Date of Patent: Mar. 19, 2013

(54) MANUFACTURING METHOD FOR METAL MARK PLATE

(75) Inventors: Yu-To Chao, Taipei (TW); Hsueh-Tsu Chang, Taipei (TW); Yau-Hung Chiou, Taipei (TW)

(73) Assignee: Chenming Mold Ind. Corp., Taipei (TW)

( * ) Notice: Subject to any disclaimer, the term of this patent is extended or adjusted under 35 U.S.C. 154(b) by 288 days.

(21) Appl. No.: 13/027,470

(22) Filed: Feb. 15, 2011

(65) Prior Publication Data
US 2012/0138585 A1 Jun. 7, 2012

(30) Foreign Application Priority Data
Dec. 1, 2010 (TW) ............................... 99141682 A

(51) Int. Cl.
*B23K 26/22* (2006.01)
*B23K 26/42* (2006.01)
(52) U.S. Cl. .................. 219/121.64; 228/175; 228/223; 29/527.1
(58) Field of Classification Search ............. 219/121.64, 219/121, 85; 228/175, 223; 29/527.1, DIG. 38; 40/607.13
See application file for complete search history.

(56) References Cited

U.S. PATENT DOCUMENTS
5,714,234 A * 2/1998 Robertson .................. 428/195.1

* cited by examiner

*Primary Examiner* — Samuel M Heinrich
(74) *Attorney, Agent, or Firm* — WPAT, P.C.; Anthony King

(57) ABSTRACT

A manufacturing method for a metal mark plates is disclosed. In this manufacturing method, a welding flux layer is firstly disposed onto a metal base plate, and a plurality of metal mark parts are arranged on corresponding regions of the metal base plate on which the welding flux layer is disposed. Thereafter, a laser spot welding step is performed to assemble the metal mark parts with the metal base plate by heating the backside of the metal back plate at a location corresponding to the welding flux layer. This manufacturing method therefore provides a fast and stable welding way for manufacturing the metal mark plate. Besides, this manufacturing method can be applied for automatic production and precise mass production could thereby be accomplished.

10 Claims, 6 Drawing Sheets

A. Performing a shaping step

B. Performing a disposing step

C. performing a laser spot welding step

D. Performing a modification step

MANUFACTURING METHOD FOR METAL MARK PLATE

BACKGROUND OF THE INVENTION

1. Field of the Invention

The present invention relates to a manufacturing method for a metal mark plate, and more particularly, to a method for manufacturing a metal mark plate in fast speed and high quality.

2. Brief Description of the Related Art

Metal mark plates are often disposed on a product or an object as marks or logos of a brand or a trademark. Several specific characters or specific patterns are protruded from the metal mark plates to provide with a three-dimensional appearance for thereby providing a stronger impression on the viewer.

The existing metal mark plate is manufactured by various kinds of methods. For example, a metal character or pattern is formed by a cutting method, and then the metal character or pattern is fixedly adhered or riveted to a metal base plate. However, the current methods are mostly complex and time-consuming and labor-consuming, and it is also a difficulty to control and monitor the yield rate thereof. Furthermore, the current methods do not comply with the requirement of automatic productions and can not be used for precise mass production. As the foregoing, it is an object of the present invention to provide a method for manufacturing a metal mark plate to solve the above-described deficiencies and enhance the application in industry.

SUMMARY OF THE INVENTION

In order to overcome the deficiencies of the preceding prior art, an object of the present invention is to provide a manufacturing method for a metal mark plate that is capable of solving the above-described deficiencies.

With the object in mind, the present invention provides a manufacturing method for a metal mark plate, comprising:

Step A: performing a shaping step by shaping a metal material into several metal mark parts by a one-shot forming technique, wherein a bottom surface of each of the metal mark parts is a connection surface;

Step B: performing a disposing step by disposing a welding flux layer onto at least one region of a surface of a metal base plate; and Step C: performing a laser spot welding step by contacting the connection surface of the metal mark part to the region of the metal base plate on which the welding flux layer is disposed, and then heating a backside of the region of the metal base plate on which the welding flux layer is disposed by a laser for fixedly fixing the metal mark part, the welding flux layer, and the metal base plate with one another so as to provide with a high bonding strength therebetween.

The manufacturing method for a metal mark plate of the present invention further comprises a Step D: performing a modification step to the appearance of the assembled metal mark part and metal base plate, wherein the modification step is performed by a surface polishing method or a hairline-electroplating method in order to increase the quality of the surface thereof.

Wherein, the one-shot forming technique in Step A can be of impact molding, punch shaping, impact extrusion, metal casting, sintering, or compression molding.

Wherein, the shape of the metal mark part corresponds to a character or a pattern.

Wherein, each of the metal mark parts has an adequate thickness to provide a three-dimensional view to the viewer.

Wherein, the welding flux layer is disposed on the metal base plate by printing or spreading.

The manufacturing method for a metal mark plate of the present invention is designed to firstly dispose the welding flux layer on the metal base plate and arrange the metal mark part on the region of the metal base plate on which the welding flux layer is disposed, then perform the laser spot welding step to assemble the metal mark part with the metal base plate by heating the backside of the metal base plate at a location corresponding to the welding flux layer. The present invention therefore provides a fast and stable welding technique for manufacturing a metal mark plate. Since the manufacturing procedure is simplified, the present invention can be applied to automatic production and precise mass production could thereby be accomplished.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
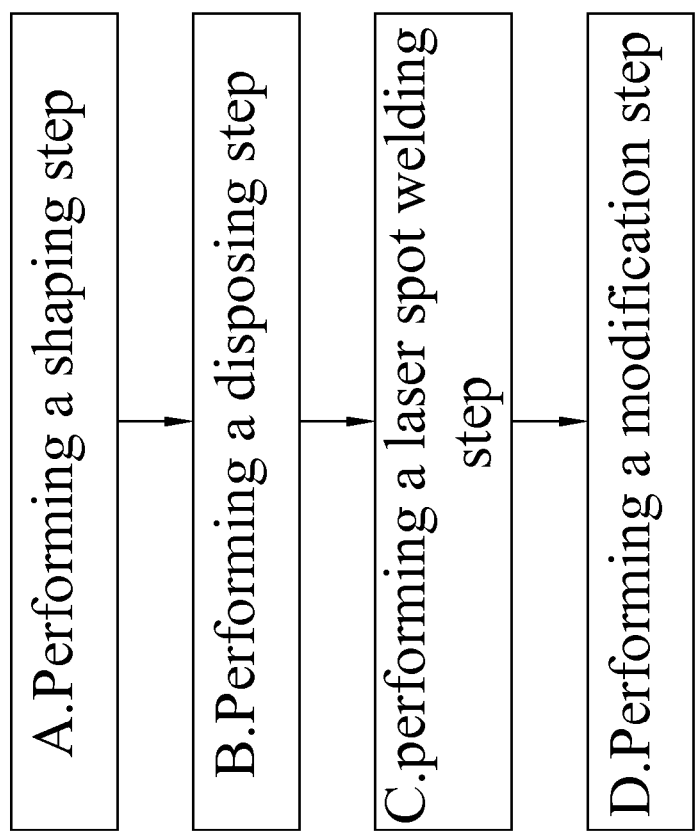
FIG. 1 is a flow chart of the procedure of the manufacturing method for a metal mark plate according to the present invention.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Please refer to FIG. 1 for a preferred embodiment of the manufacturing method for a metal mark plate according to the present invention that comprises:

Step A: performing a shaping step by shaping a metal material into several metal mark parts by a one-shot forming technique, wherein a bottom surface of each of the metal mark parts is a connection surface;

Step B: performing a disposing step by disposing a welding flux layer onto at least one region of a surface of the metal base plate;

Step C: performing a laser spot welding step by contacting the connection surface of at least one of the metal mark parts to the region of the metal base plate on which the welding flux layer is disposed, and then heating a backside of the region of the metal base plate on which the welding flux layer is disposed by a laser for fixedly fixing the metal mark part, the welding flux layer, and the metal base plate with one another so as to provide with a high bonding strength therebetween; and Step D: performing a modification step to the surface of the assembled metal mark part and metal base plate surface, wherein the modification step is performed by a surface polishing method or a hairline-electroplating method in order to increase the quality of the surface thereof.

Figure 2:
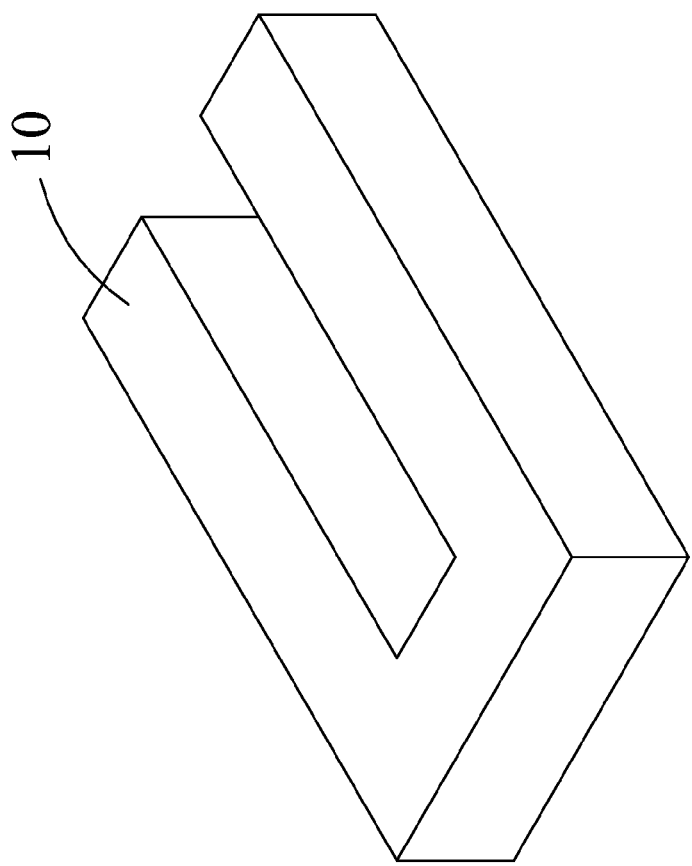
FIG. 2 is one schematic diagram of the manufacturing method for a metal mark plate according to an embodiment of the present invention.

Please further refer to FIG. 2, wherein the shaping step is Step A is an one-shot forming technique, and can be of impact molding, punch shaping, impact extrusion, metal casting, sintering, or compression molding. Further, the one-shot forming technique shapes a metal material into a plurality of metal mark parts 10 each of which has a shape corresponds to a character or a pattern, wherein each of the metal mark parts 10 has an adequate thickness to provide a three-dimensional view to the viewers; and a bottom surface thereon is a connection surface.

Figure 3:
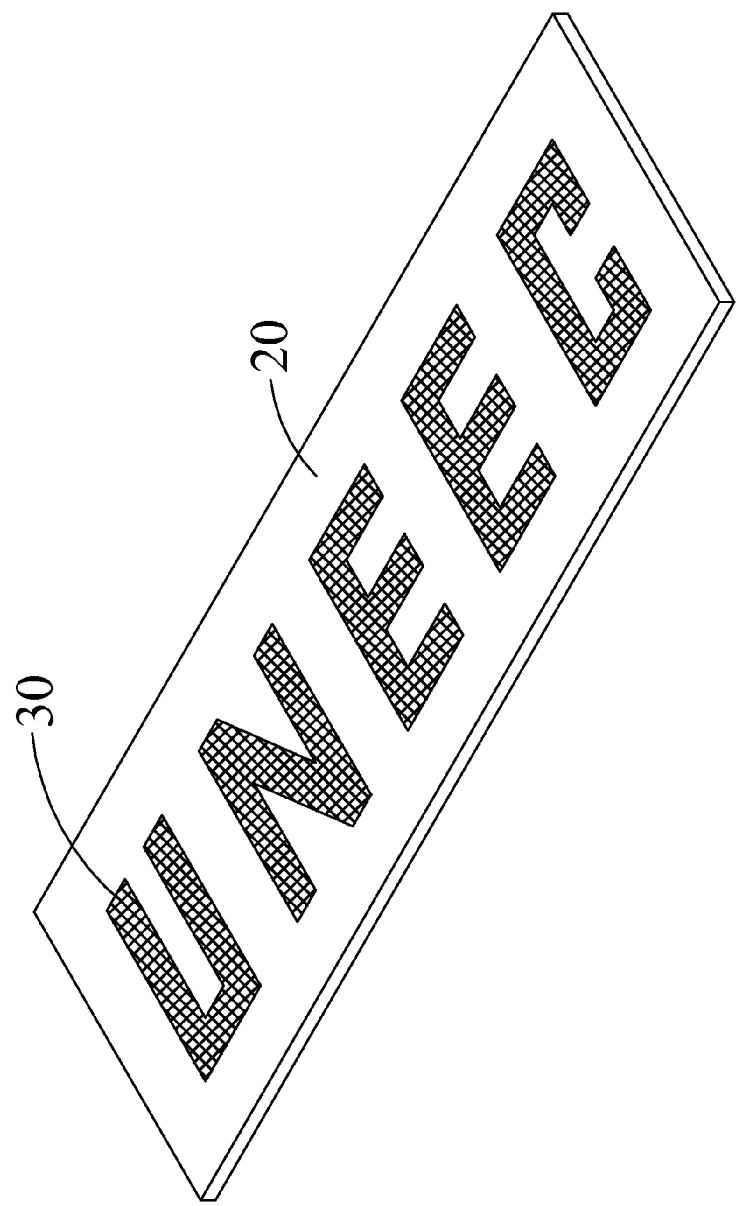
FIG. 3 is another schematic diagram of the manufacturing method for a metal mark plate according to the embodiment of the present invention.

Referring to FIG. 3, in the above-mentioned Step B, the welding flux layer 30 is disposed onto at least one region of the metal base plate 20, wherein the welding flux layer 30 is disposed onto the metal base plate 20, for example, by printing or spreading.

Figure 4:
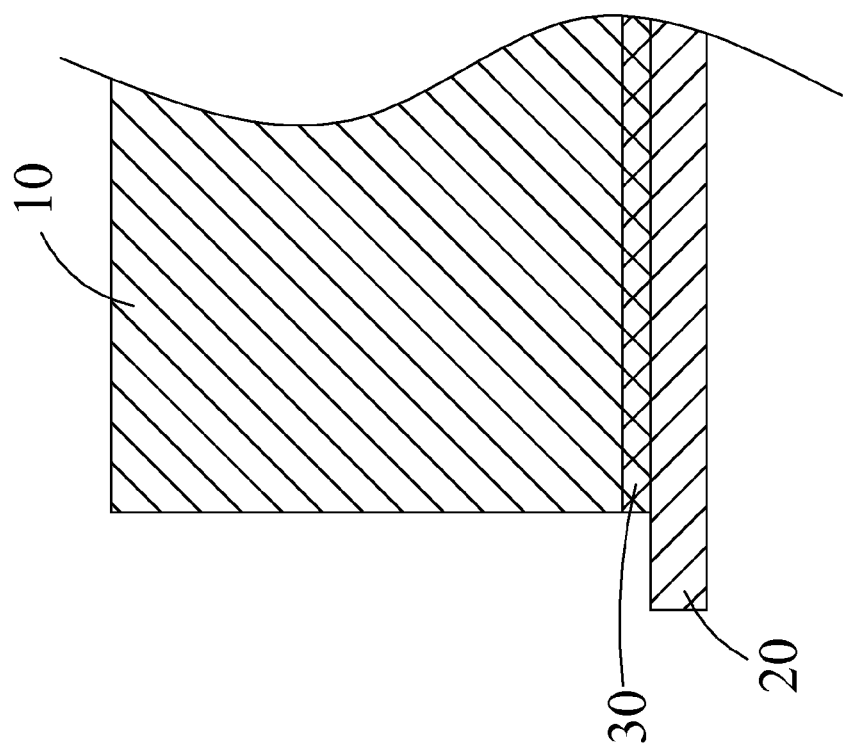
FIG. 4 is a schematic diagram of the manufacturing method for a metal mark plate according to the embodiment of the present invention.
Figure 5:
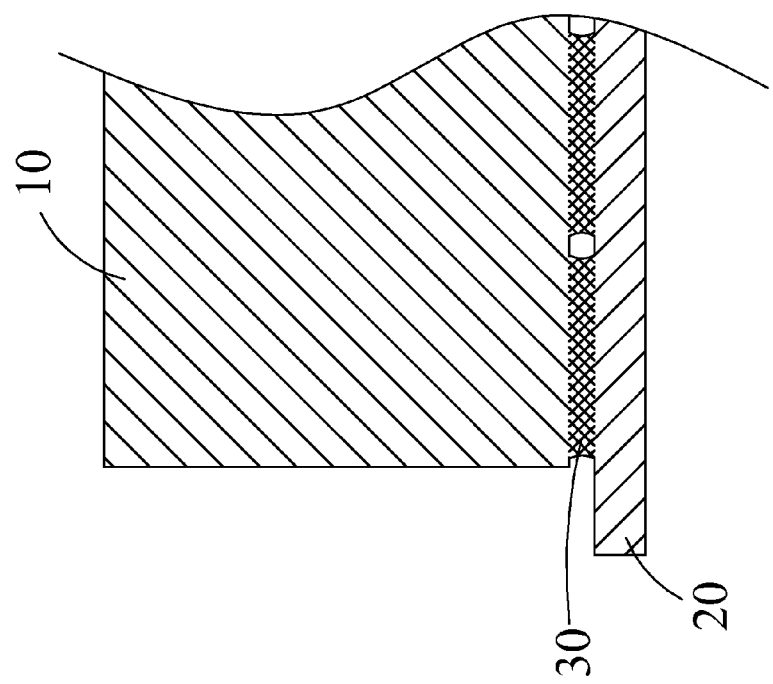
FIG. 5 is a schematic diagram of the manufacturing method for a metal mark plate according to the embodiment of the present invention.

Referring to FIGS. 4 and 5, in the Step C, the connection surface of the metal mark parts 10 is disposed to contact with the welding flux layer 30, which is disposed on the region of the metal base plate surface 20, and then the laser spot welding step is performed to heat the backside of the metal base plate surface 20 at a location corresponding to the welding flux layer 30 by a laser so as to assemble the metal mark part 10, the welding flux layer 30 and the region of the metal base plate 20 with one another by melting for providing with a high strength bonding.

In the above-mentioned Step D, a modification step is performed to the appearance of the surface of the assembled metal mark part 10 and metal base plate 20, wherein the modification step is performed by a surface polishing method or a hairline-electroplating method in order to increase the quality of the surface thereof.

Figure 6:
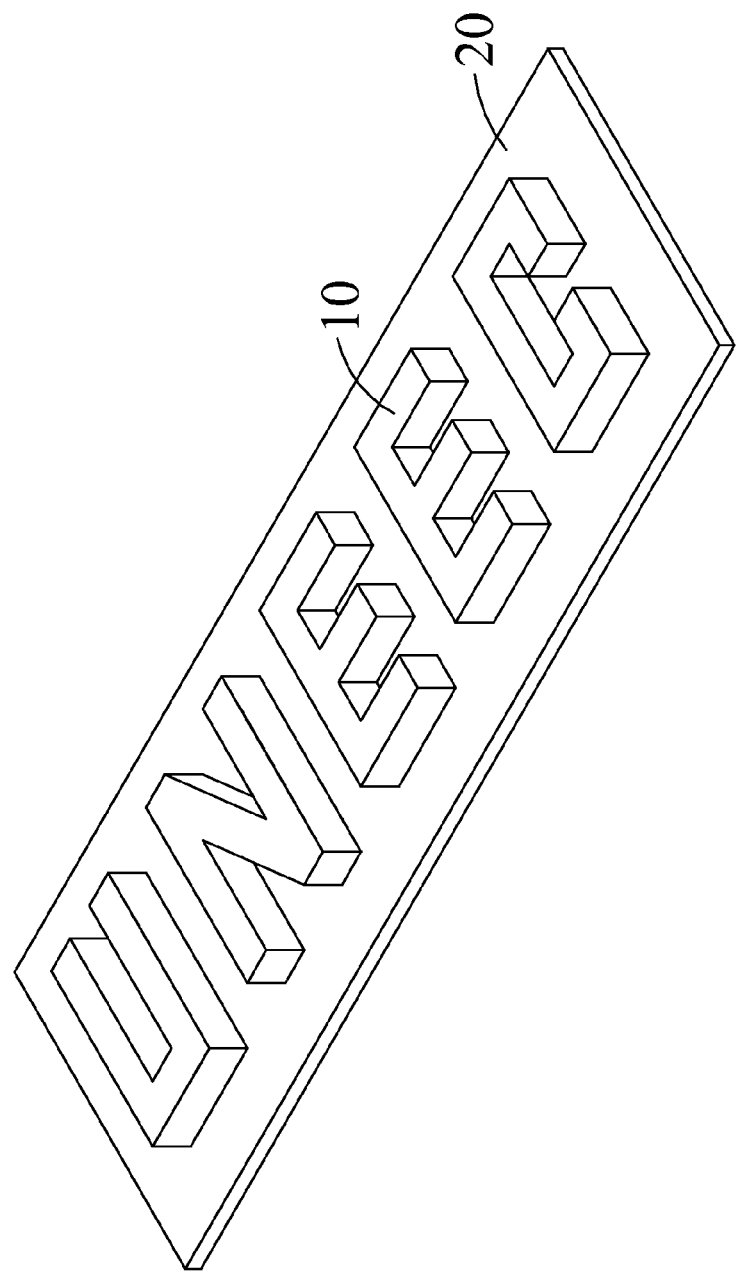
FIG. 6 is a schematic diagram of a finished product of the manufacturing method for a metal mark plate according to the present invention.

Please simultaneously refer to FIG. 6, the manufacturing method for a metal mark plate of the present invention is designed to firstly dispose the welding flux layer 30 on the metal base plate 20 and contact the metal mark part 10 that is to be welded to the region of the metal base plate 20 on which the welding flux layer 30 is disposed. Thereafter, the laser spot welding step is performed to heat the backside of the corresponding region of the metal base plate 20 on which the welding flux layer 30 is disposed thereon by a laser for welding the metal mark part 10 onto the metal base plate 20 fixedly. As a result, the present invention provides a fast and stable welding technique for manufacturing the metal mark plate; and since the steps of the manufacturing procedure are simplified, the present invention can be applied for automatic production and precise mass production could thereby be accomplished.

While the invention has been described with reference to a preferred embodiment thereof, it is to be understood that modifications or variations may be easily made without departing from the spirit of this invention, which is defined in the appended claims.

What is claimed is:

1. A manufacturing method for a metal mark plate comprising:
    Step A: performing a shaping step by shaping a metal material into a plurality of metal mark parts by a one-shot forming technique, wherein a bottom surface of each of the metal mark parts is a connection surface;
    Step B: performing a disposing step by disposing a welding flux layer onto at least one region of a surface of a metal base plate; and
    Step C: performing a laser spot welding step by contacting the connection surface of the metal mark part to the region of the metal base plate on which the welding flux layer is disposed, and then heating a backside of the region of the metal base plate on which the welding flux layer is disposed by a laser for fixedly fixing the metal mark part, the welding flux layer, and the metal base plate with one another so as to provide with a high bonding strength therebetween.

2. The manufacturing method for the metal mark plate as defined in claim 1 further comprising:
    Step D: performing a modification step to the appearance of the assembled metal mark part and metal base plate.

3. The manufacturing method for the metal mark plate as defined in claim 2, wherein the modification step is performed by a surface polishing method or a hairline-electroplating method in order to increase the quality of the surface thereof.

4. The manufacturing method for the metal mark plate as defined in claim 1, wherein the one-shot forming technique in Step A is of impact molding, punch shaping, impact extrusion, metal casting, sintering, or compression molding.

5. The manufacturing method for the metal mark plate as defined in claim 2, wherein the one-shot forming technique in Step A is of impact molding, punch shaping, impact extrusion, metal casting, sintering, or compression molding.

6. The manufacturing method for the metal mark plate as defined in claim 1, wherein each of the metal mark parts has a shape corresponds to a character or a pattern.

7. The manufacturing method for the metal mark plate as defined in claim 2, wherein each of the metal mark part has a shape corresponds to a character or a pattern.

8. The manufacturing method for the metal mark plate as defined in claim 1, wherein each of the metal mark parts has an adequate thickness to provide a three-dimensional view to the viewer.

9. The manufacturing method for the metal mark plate as defined in claim 2, wherein each of the metal mark parts has an adequate thickness to provide a three-dimensional view to the viewer.

10. The manufacturing method for the metal mark plate as defined in claim 1, wherein the welding flux layer is disposed onto the metal base plate by printing or spreading.

* * * * *